(12) United States Patent
Mattina et al.

(10) Patent No.: US 11,379,556 B2
(45) Date of Patent: Jul. 5, 2022

(54) APPARATUS AND METHOD FOR MATRIX OPERATIONS

(71) Applicant: Arm Limited, Cambridge (GB)

(72) Inventors: Matthew Mattina, Boylston, MA (US); Zhigang Liu, Westford, MA (US); Paul Nicholas Whatmough, Cambridge, MA (US); David Hennah Mansell, Norwich (GB)

(73) Assignee: Arm Limited, Cambridge (GB)

( * ) Notice: Subject to any disclaimer, the term of this patent is extended or adjusted under 35 U.S.C. 154(b) by 327 days.

(21) Appl. No.: 16/417,937

(22) Filed: May 21, 2019

(65) Prior Publication Data

US 2020/0372097 A1    Nov. 26, 2020

(51) Int. Cl.
*G06F 17/16*    (2006.01)

(52) U.S. Cl.
CPC ................... *G06F 17/16* (2013.01)

(58) Field of Classification Search
CPC .............. G06F 17/16; G06F 12/0207; G06F 2212/454; G06F 16/2237
See application file for complete search history.

(56) References Cited

U.S. PATENT DOCUMENTS

| | | | |
|---|---|---|---|
| 2018/0189675 A1* | 7/2018 | Nurvitadhi | G06F 16/285 |
| 2018/0275909 A1* | 9/2018 | Agrawal | G06F 7/00 |
| 2019/0042237 A1* | 2/2019 | Azizi | G06F 9/3001 |
| 2019/0042257 A1 | 2/2019 | Baum et al. | |
| 2019/0042542 A1* | 2/2019 | Narayanamoorthy | G06F 9/383 |
| 2019/0065150 A1* | 2/2019 | Heddes | G06N 3/082 |

(Continued)

FOREIGN PATENT DOCUMENTS

| | | |
|---|---|---|
| EP | 3 343 392 | 7/2018 |
| GB | 2476800 | 7/2011 |

OTHER PUBLICATIONS

E. Nurvitadhi, A. Mishra and D. Marr, "A sparse matrix vector multiply accelerator for support vector machine," 2015 International Conference on Compilers, Architecture and Synthesis for Embedded Systems (CASES), 2015, pp. 109-116 (Year: 2015).*

(Continued)

*Primary Examiner* — Matthew D Sandifer
(74) *Attorney, Agent, or Firm* — Nixon & Vanderhye P.C.

(57) ABSTRACT

There is provided a data processing apparatus to perform an operation on a first matrix and a second matrix. The data processing apparatus includes receiver circuitry to receive elements of the first matrix, elements of the second matrix, and correspondence data to indicate where the elements of the first matrix are located in the first matrix. Determination circuitry performs, using the correspondence data, a determination of whether, for a given element of the first matrix in column i of the first matrix, a given element of the second matrix occurs in row i of the second matrix. Aggregation circuitry calculates an aggregation between a given row in the first matrix and a given column in the second matrix and includes: functional circuitry to perform, in dependence on the determination, a function on the given element of the first matrix and the given element of the second matrix to produce a partial result.

19 Claims, 10 Drawing Sheets

(56) References Cited

U.S. PATENT DOCUMENTS

2020/0026746 A1* 1/2020 Tu .................... G06F 17/16

OTHER PUBLICATIONS

International Search Report and Written Opinion of the International Searching Authority for PCT/GB2020/050801 dated Jun. 24, 2020, 17 pages.
Chen et al., "Eyeriss: A Spatial Architecture for Energy-Efficient Dataflow for Convolutional Neural Networks", 2016 ACM/IEEE 43rd Annual International Symposium on Computer Architecture (ISCA), Jun. 18-22, 2016, 13 pages.
Buluç et al., "Parallel Sparse Matrix-Vector and Matrix-Transpose-Vector Multiplication Using Compressed Sparse Blocks", Proceedings of the $21^{st}$ annual Symposium on Parallelism in Algorithms and Architectures, 2009, 12 pages.
Parashar et al., "SCNN: An Accelerator for Compressed-sparse Convolutional Neural Networks", ISCA '17, Jun. 24-28, 2017,14 pages.
Moons et al., "A 0.3-2.6 TOPS/W Precision-Scalable Processor for Real-Time Large-Scale ConvNets", Symposium on VLSI Circuits, 2016, 2 pages.
Jouppi et al., "In-Datacenter Performance Analysis of a Tensor Processing Unit™", 44th International Symposium on Computer Architecture (ISCA), Toronto, Canada, Jun. 26, 2017, 17 pages.

* cited by examiner

APPARATUS AND METHOD FOR MATRIX OPERATIONS

TECHNICAL FIELD

The present disclosure relates to data processing.

DESCRIPTION

When performing matrix operations such as matrix multiplications, a number of sub-steps may be performed. In many cases, these sub-steps have little effect on the overall matrix operation. For instance, when two sparse matrices (those containing a comparatively large proportion of entries with a value of 0) are multiplied together, a large number of multiplications by zero take place. This can particularly be the case in Convolutional Neural Networks (CNNs), which are often used in, for instance, image classification. Such multiplications can be wasteful, since multiplication by zero causes a result of zero, yet the process of actually performing the multiplication can still consume circuit time and power. Furthermore, storing such matrices can use a lot of storage space. It would therefore be desirable to be able to perform such operations using a smaller number of sub-steps. It would also be desirable for such matrices to be stored using less storage space, thereby reducing resource consumption, as well as power and potentially circuit size.

SUMMARY

Viewed from a first example configuration, there is provided a data processing apparatus to perform an operation on a first matrix and a second matrix, the data processing apparatus comprising: receiver circuitry to receive elements of the first matrix, elements of the second matrix, and correspondence data to indicate where the elements of the first matrix are located in the first matrix; determination circuitry to perform, using the correspondence data, a determination of whether, for a given element of the first matrix in row i, column j i of the first matrix, a given one of the elements of the second matrix occurs in row j, column i of the second matrix; and aggregation circuitry to calculate an aggregation of between a given row i in the first matrix and a given column i in the second matrix, comprising: functional circuitry to perform, in dependence on the determination, a function on the given element of the first matrix and the given element of the second matrix to produce a partial result.

Viewed from a second example configuration there is provided a data processing method of performing an operation on a first matrix and a second matrix, the method comprising the steps: receiving elements of the first matrix, elements of the second matrix, and correspondence data to indicate where the elements of the first matrix are located in the first matrix; performing, using the correspondence data, a determination of whether, for a given element of the first matrix in column i of the first matrix, a given element of the second matrix occurs in row i of the second matrix; and calculating an aggregation between a given row in the first matrix and a given column in the second matrix, by performing, in dependence on the determination, a function on the given element of the first matrix and the given element of the second matrix to produce a partial result.

Viewed from a third example configuration there is provided a data processing apparatus comprising: decode circuitry to receive one or more instructions comprising a matrix operation instruction, wherein the matrix operation instruction references elements of a first matrix, elements of a second matrix, and correspondence data to indicate where the elements of the first matrix are located in the first matrix, wherein in response to receiving the matrix operation instruction, the decode circuitry generates one or more control signals in order to cause one or more execution units to perform a matrix operation on the first matrix and the second matrix.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
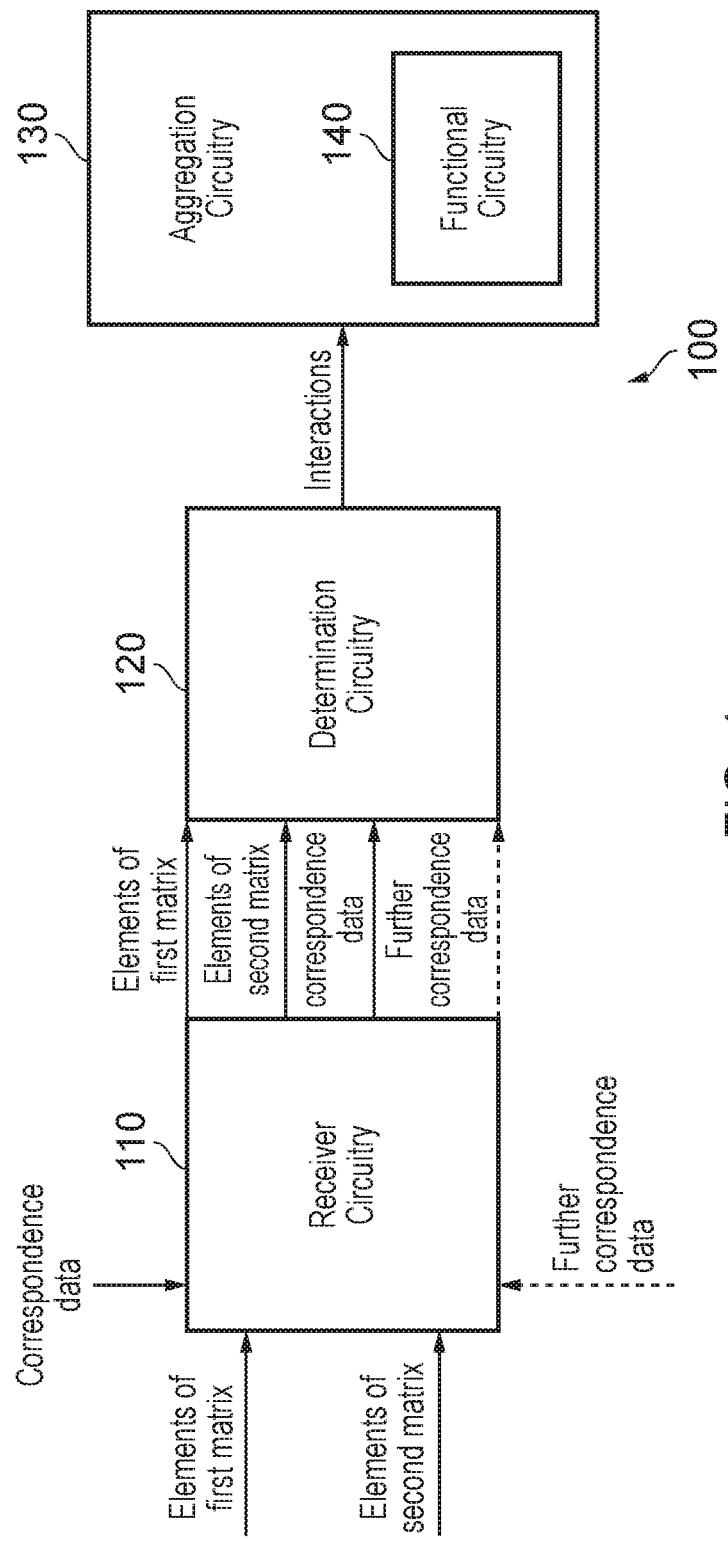
FIG. 1 schematically illustrates an example data processing apparatus in accordance with some embodiments.

Before discussing the embodiments with reference to the accompanying figures, the following description of embodiments is provided.

In accordance with some embodiments there is provided a data processing apparatus to perform an operation on a first matrix and a second matrix, the data processing apparatus comprising: receiver circuitry to receive elements of the first matrix, elements of the second matrix, and correspondence data to indicate where the elements of the first matrix are located in the first matrix; determination circuitry to perform, using the correspondence data, a determination of whether, for a given element of the first matrix in column i of the first matrix, a given element of the second matrix occurs in row i of the second matrix; and aggregation circuitry to calculate an aggregation between a given row in the first matrix and a given column in the second matrix, comprising: functional circuitry to perform, in dependence on the determination, a function on the given element of the first matrix and the given element of the second matrix to produce a partial result.

Some or all of the elements of the first matrix and the second matrix are received, together with the correspondence data. The correspondence data is used to indicate, where not all of the elements have been provided, where the provided elements are located in the first and/or second matrices. The determination circuitry provides an indication of whether two of the provided elements (one in the first matrix and one in the second matrix) will 'interact' with each other, e.g. for one of the given elements in column i of the first matrix, whether there one of the given elements of the second matrix in a row i, such that the two elements would interact with each other if certain operations (such as multiplication or addition) were performed between the first matrix and the second matrix. Based on this determination, functional circuitry performs a function on the given elements of the first and second matrices. For instance, if the two elements would interact, then the function is performed to produce a partial result, whereas if the two elements would not interact then the function is not performed (or merely returns '0' as the partial result). The partial results are then aggregated together. The aggregation is performed in respect of a given row in the first matrix and a given column of the second matrix. In this manner, it is possible to perform an operation between a first matrix and a second matrix, without providing all of the elements of the first matrix and the second matrix. In particular, by determining those locations where interactions between the first and second matrices occur, it is possible to limit the number of operations that must be calculated overall. Furthermore, the storage requirements can be reduced, since it is only necessary to store the elements of the first matrix, the elements of the second matrix, and the correspondence data rather than the entirety of the first matrix, and the entirety of the second matrix.

In some embodiments, the elements of the first matrix are elements of a compressed form of the first matrix; and the compressed form of the first matrix is produced by removing at least some entries from the first matrix that are zero, and removing at least some columns or rows where each entry is zero. By removing some of the entries having zero, and by removing at least some of the columns or rows where each entry of that column or row is zero, it is possible to reduce the overall dimensions of the matrix and the number of entries that need to be provided for that matrix. In some embodiments, the removal of values other than zero can be used. However, it will be appreciated that in the case of sparse matrices (where a high proportion of the values are zero), there may be a lot of operations performed where one of the operands is zero. Such operations can be time consuming even though the result may be predictable or even irrelevant. The number of operations can be reduced by removing such values from the matrices.

In some embodiments, the correspondence data indicates, for each of the elements of the first matrix, a row number and a column number; and the row number and the column number for a given element in the elements correspond with a row and column of where the given element is located in the first matrix. The correspondence data therefore indicates how to turn the elements of the first matrix into the first matrix. This can be used in order to compress the first matrix by omitting particular known values. Then, instead of providing every element of the matrix, compression can be achieved by only providing some of the elements of the matrix, together with where those elements are actually located.

In some embodiments, the receiver circuitry is adapted to receive further correspondence data to indicate where the elements of the second matrix are located in the second matrix; and the determination circuitry is adapted to perform the determination using the further correspondence data in addition to the correspondence data. Similarly to the correspondence data, which provides locational information for the provided elements of the first matrix, the further correspondence data provides locational information for the provided elements of the second matrix.

In some embodiments, the further correspondence data indicates, for each of the elements of the second matrix, a row number and a column number; and the row number and the column number for a given element in the elements correspond with a row and column of where the given element is located in the second matrix. Note that there is no obligation for the correspondence data and the further correspondence data to have the same format or even to be exactly the same information.

In some embodiments, the elements of the second matrix are elements of a compressed form of the second matrix; and the compressed form of the second matrix is produced by removing at least some entries from the second matrix that are zero, and removing at least some columns or rows where each entry is zero. By providing both the first matrix and the second matrix in a compressed form, it is possible to reduce the amount of storage required to perform operations on the two matrices and also to reduce a number of calculations that are performed in performing the operation.

In some embodiments, the operation comprises a multiplication operation on the first matrix and the second matrix; the aggregation circuitry comprises dot product circuitry to calculate, as the aggregation, a dot product of the given row and the given column; the functional circuitry comprises multiplication circuitry to perform a multiplication as the function; and the dot product circuitry comprises addition circuitry to add each partial result produced for the given row and the given column. Performing a multiplication between two matrices can be time consuming, since it involves a number of calculations being performed. However, it is often the case that only some of the calculations are of interest. For instance, the calculations of interest could be those where one of the values is non-zero. Hence, by compressing one or both of the matrices, and using the correspondence data, it is possible to determine where relevant interactions (e.g. between non-zero elements) will occur and to perform those specific calculations. This can reduce the number of calculations that are performed.

In some embodiments, the receiver circuitry is adapted to receive elements of a third matrix; the operation comprises an addition operation of the third matrix with a result of the multiplication operation of the first matrix and the second matrix; and the addition circuitry is adapted to add each partial result produced for the given row and the given column, together with the one of the elements of the third matrix. A multiply accumulate operation is performed where two operands are multiplied together and the result is added to an "accumulator" that adds up the result of a number of such multiplications.

In some embodiments, the multiplication circuitry is adapted to output the value '0' in response to the determination being that none of the elements of the second matrix occurs in row i of the second matrix. If none of the elements of the second matrix occurs in row i of the second matrix then there may be no relevant interaction with those elements. For example, any such interaction would be with an element of the matrix that is not provided. This could occur, for instance, if all of the elements are zero. As a consequence of no calculation being performed, the value of zero is output directly, thereby removing the need for a more complex calculation to be performed.

In some embodiments, the determination circuitry is adapted, in response to the determination circuitry making the determination that the given element of the second matrix occurs in the location other than row j, column i of the second matrix, to provide the value '0' as an input to the multiplication circuitry. One way of causing the multiplication circuitry to output the value '0' is to provide '0' as an input to the multiplication circuitry itself.

In some embodiments, the data processing apparatus comprises: storage circuitry to store the elements of the first matrix, wherein the storage circuitry comprises the correspondence data. In such embodiments, the elements of the first matrix are stored alongside the correspondence data, which indicates where those elements appear within the first matrix.

In some embodiments, the storage circuitry is a vector register. A vector register can be made up from a plurality of regular registers for the purpose of storing a large amount of data. Vector registers are typically wired together or organised in such a way that all of the data in a vector register can be accessed or provided simultaneously. Note that in some cases, vector registers can be scalable such that their amount of storage can be varied, in such embodiments, it is therefore possible to limit the size of the vector register so that it is sufficient to store the elements of the matrix and the correspondence data. In this way a variety of different matrix sizes (or numbers of elements) can be supported without the need for large vector registers be necessary to handle a worst case scenario.

In some embodiments, there is provided storage circuitry to store the elements of the second matrix, wherein the storage circuitry comprises the further correspondence data. In a similar manner to the storage circuitry used to store the elements of the first matrix, the second matrix can also be stored in storage circuitry and can be stored together with the further correspondence data. Note that the storage circuitry used for the first matrix and the second matrix could be the same or could be different.

In some embodiments, the storage circuitry is a vector register. The vector register used to store the second matrix could be the same vector register used to store the first matrix or it could be a different vector register.

In some embodiments, a width of the storage circuitry is b bits; each of the elements of the first matrix has a width of c bits; and a number of the elements of the first matrix is at most b/c. The number of elements can therefore be varied depending on the width of the elements and also the size of the storage. For instance, if each element is only one bit and the storage circuitry is 32 bits, then the number of the elements of the first matrix could be as much as 32.

In some embodiments, a width of the correspondence data is x bits for each of the elements of the first matrix; and the number of the elements of the first matrix is at most b/(c+x). Correspondence data may be provided for each element in order to indicate where that element lies within the first matrix. Such correspondence data may use a number of bits in dependence on the size of the first matrix. For example, if correspondence data is provided for each row (containing m columns) then the size of the correspondence data may be log 2(m) bits for each of the elements of the first matrix. Similarly, if the correspondence data was provided for each column (containing n rows) then the size of the correspondence data may be log 2(n) for each of the elements of the first matrix. If the correspondence data is not provided on a row or column basis, and thus each element of the first matrix must have its row and column specified, then the correspondence data may be log 2(m)+log 2(n) bits.

In some embodiments, a width of the storage circuitry is b bits; each of the elements of the second matrix has a width of c bits; and a number of the elements of the second matrix is at most b/c. Similarly to the above, the number of elements of the second matrix may be varied in dependence on the size of the storage circuitry storing the elements of the second matrix as well as the number of bits used to represent each element.

In some embodiments, a width of the further correspondence data is x bits for each of the elements of the second matrix; and the number of the elements of the second matrix is at most b/(c+x). Similarly to the above, the further correspondence data has a width dependent on the size of the second matrix.

In accordance with some embodiments there is provided a data processing apparatus comprising: decode circuitry to receive one or more instructions comprising a matrix operation instruction, wherein the matrix operation instruction references elements of a first matrix, elements of a second matrix, and correspondence data to indicate where the elements of the first matrix are located in the first matrix, wherein in response to receiving the matrix operation instruction, the decode circuitry generates one or more control signals in order to cause one or more execution units to perform a matrix operation on the first matrix and the second matrix.

In accordance with such aspects, it is possible to provide an instruction that references elements of a first matrix and elements of a second matrix, and also correspondence data that indicates how the elements of the first matrix relate to the first matrix (e.g. where the elements are located) in order to perform an operation on the first matrix and the second matrix. Compression can be achieved by providing some, but not all, of the elements of the first matrix.

Particular embodiments will now be described with reference to the figures.

FIG. 1 schematically illustrates a data processing apparatus 100 in accordance with some embodiments. The apparatus includes receiver circuitry 110 that receives some elements of a first matrix, at least some elements of a second matrix, and correspondence data that indicates where the provided elements of the first matrix belong in the first matrix. This information is passed from the receiver circuitry to the determination circuitry 120. The determination circuitry uses the correspondence data in order to determine which of the provided elements of the first matrix interact with the elements of the second matrix when performing a matrix operation. Whether two elements will interact is dependent on their locations within the first matrix and the second matrix and the operation being performed. For example, in the case of a matrix multiplication, an element in the first row, first column of a first matrix will not interact with the element in a second row, second column of a second matrix when the first matrix and the second matrix are multiplied together. Since the correspondence data indicates where the provided elements of the first matrix are located within the first matrix, this information can be used to determine interacting pairs of elements and their locations.

Information regarding the interactions that occur is passed to aggregation circuitry 130. The aggregation circuitry 130 is used to calculate an aggregation over a number of interacting pairs. For example, the aggregation circuitry could calculate an aggregation of pairs that interact for a given row/column when performing matrix multiplication. The aggregation circuitry 130 includes functional circuitry 140 to perform the matrix operation. In particular, for a particular pair of elements (one from the first matrix and one from the second matrix) that the determination circuitry 120 has determined will interact, the functional circuitry performs the operation for which the interaction is determined to occur. The functional circuitry thereby produces a partial result for a single interacting pair which is then aggregated by the aggregation circuitry 130.

In some embodiments, the receiver circuitry 110 also receives further correspondence data to indicate where the provided elements of the second matrix occur in the second matrix. This could be the case if, for instance, only some of the elements of the second matrix are provided. The further correspondence data is passed to the determination circuitry 120, which uses this further correspondence data in order to determine the interacting pairs. In other embodiments, the further correspondence data can be foregone. For instance, this may be the case where the elements of the second matrix include all of the elements of the second matrix.

Figure 2:
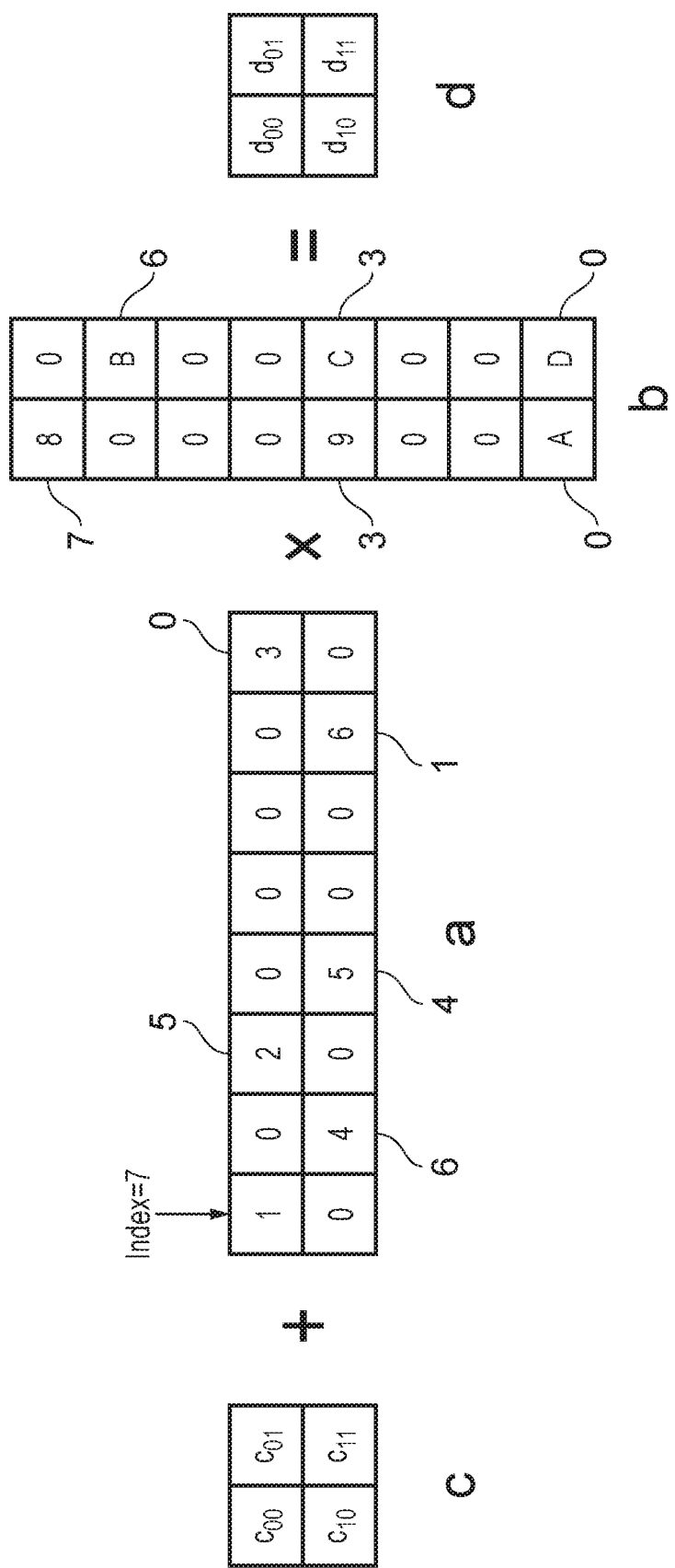
FIG. 2 shows a matrix multiply-accumulate operation and how the location of certain elements of the matrices can be represented.

FIG. 2 illustrates how the correspondence data and the optional further correspondence data can be used to indicate the locations of the elements of the first matrix and the second matrix in the first matrix and the second matrix respectively. In the case of FIG. 2, an example is illustrated of a multiply-accumulate operation in which a result of the multiplication between matrix a and matrix b is added to an accumulator matrix c in order to provide a result matrix d. In this example, the accumulator matrix c is a 2×2 matrix, the first matrix a is an 8×2 matrix, the second matrix is a 2×8 matrix, and the result matrix d is a 2×2 matrix. The nature of matrix multiplication means that the result of the multiplication of matrix a by matrix b will be a 2×2 matrix. It will be appreciated, of course, that other sizes matrices can be used and indeed, the same process can be used to perform matric multiplication without the accumulation operation.

In this example, the provided elements of the first matrix a are those elements that are non-zero. Similarly, the provided elements of the second matrix b are those values that are non-zero. In the case of the first matrix a, the correspondence data is provided for each row and provides an index of where each non-zero element is located within that row. For instance, in the first row of matrix a, there are non-zero elements at indexes 0, 5 and 7. In the second row, there are non-zero values at indexes 1, 4 and 6. Consequently, the correspondence data for the first row of the first matrix a will represent the values, 0, 5 and 7 and the correspondence data will indicate, for the second row, the values 1, 4 and 6. In respect of the second matrix b, the further correspondence data is provided for each column. In this example, the first column of matrix b contains non-zero values at indexes 0, 3 and 7 and so the further correspondence data for the first column will include the indexes 0, 3 and 7. In the second column, non-zero values are found at indexes 0, 3 and 6. Consequently the further correspondence data will indicate that the elements of the second matrix b are located at positions 0, 3 and 6.

Using the correspondence data and the further correspondence data, it is possible to reconstruct the first and the second matrix respectively from the provided elements of the first matrix and the provided elements of the second matrix.

Figure 3:
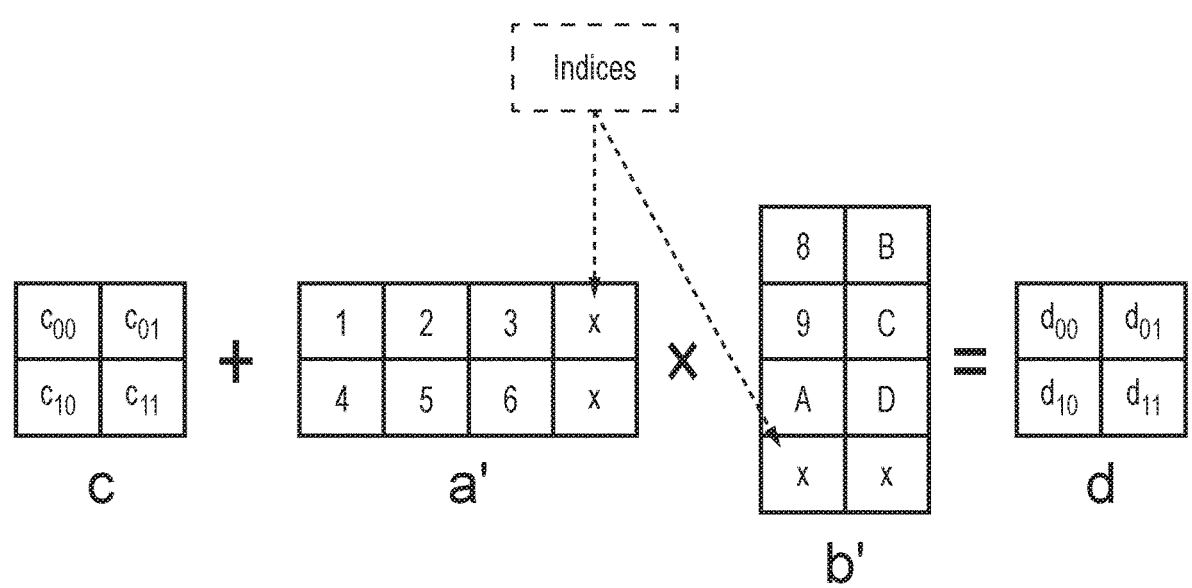
FIG. 3 shows some of the matrices of FIG. 2 in compressed form, together with correspondence data that indicates how the elements in the compressed matrices are located within the (original) matrices.

FIG. 3 illustrates how the matrices a and b can be compacted using the correspondence data in order to form compacted matrices a' and b' respectively. In this case, the compacted matrices are made up of the non-zero elements of the original matrices a and b. In this way, the first matrix has reduced from 8×2 to 3×2 and the second matrix b has reduced from 2×8 to 2×3. The storage space necessary to store or represent the matrices is therefore reduced as compared to a situation where the matrices are stored or represented in their full form, even though the correspondence data (and the optional further correspondence data) are also stored. Note that in this example, the first matrix a and the second matrix b are compacted to corresponding sizes, as is appropriate for a matrix multiplication operation. However, for other matrix operations, the compacted matrices a' and b' could be compacted such that their sizes do not correspond, depending on the operation to be performed.

FIG. 3 also illustrates the manner in which the correspondence data and further correspondence data is represented. In particular, for the first matrix a, the correspondence data is provided for each row of the compacted matrix a' whereas for the second matrix b, the correspondence data is provided for each column of the compacted matrix b'.

Figure 4:
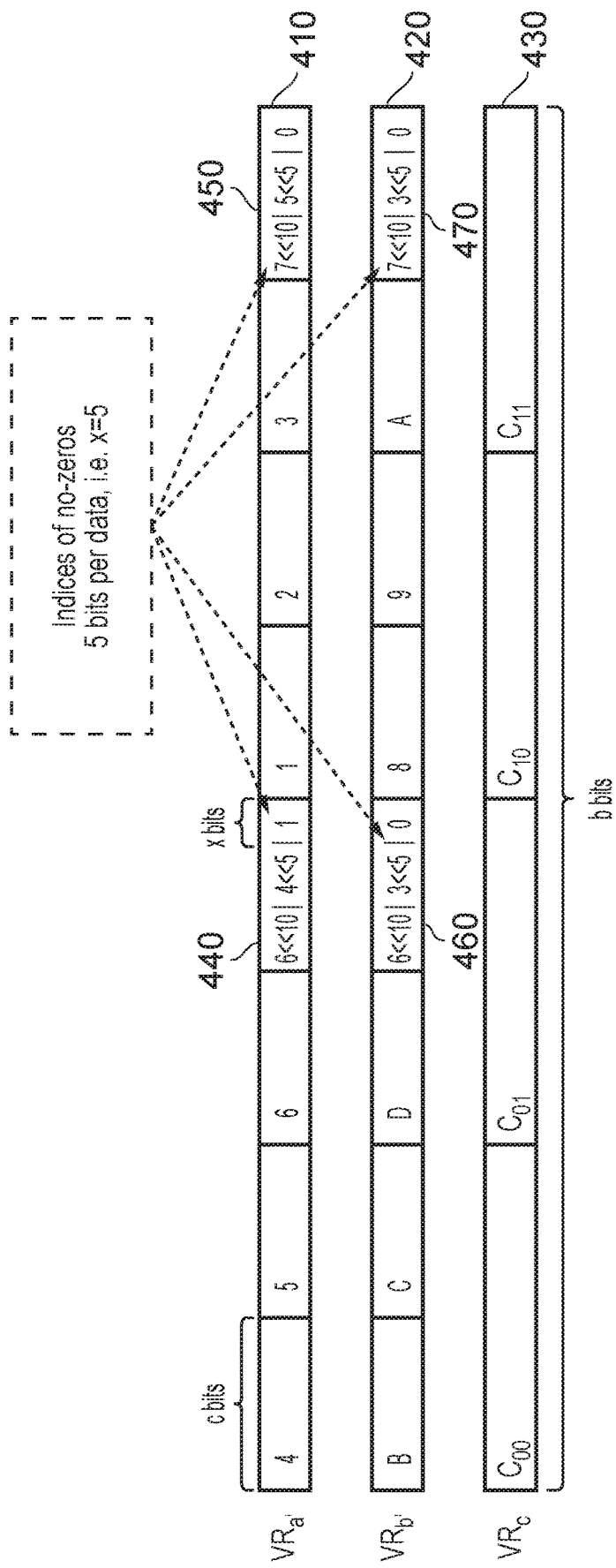
FIG. 4 demonstrates how the compressed matrices shown in FIG. 3 can be stored in registers.

FIG. 4 illustrates an example of how the compacted matrices can be stored using vector registers 410, 420, 430. This this example, two vector registers $VR_{a'}$ 410 and $VR_{b'}$ 420 are used to store the compacted matrices a' and b' with a third vector register $VR_c$ 430 being used to represent the accumulator matrix c. Each of the vector registers 410, 420, 430 has a width of b bits.

In the case of the compressed first matrix a', each of the elements of the second row is stored, followed by the correspondence data for that second row. This is followed by the elements of the first row, followed by the correspondence data for the first row. Each element is accorded a width of c bits. Thus, without correspondence data, the maximum number of elements that can be stored in one of the vector registers 410, 420, 430 is b/c. In this example, x bits are used to store each piece of correspondence data for each of the elements. Since there are three elements in each row of the first compressed matrix a', 3x bits of correspondence data is provided for each row, i.e. a total of 6x bits. Consequently, the maximum number of elements that can be stored in each of the vector registers 410, 420, 430 is equal to (b−6x)/c. Phrased differently, if x bits of correspondence data are provided for each element, then the maximum number of elements that can be stored in a vector register 410, 420, 430 is b/(c+x).

In this example, x is 5. It will be appreciated that this is more than sufficient to express the index of an element. Indeed, in this example, since the original matrices have eight elements per row (in the case of matrix a) or column (in the case of matrix b), only $\log_2(8)=3$ bits would be required per element.

In this example, the first piece of correspondence data 440, which corresponds with the elements 4, 5, and 6 is equal to 6<<10|4<<5|1. In other words, the value 1, concatenated with the value 4 left shifted five times, concatenated with the value 6 left shifted ten times. This represents the fact that the value 6 belongs in a first index, the value 5 belongs in a fourth index, and the value 4 belongs in a sixth index. This is shown in the second row of matrix a in FIG. 2. The shifting is performed in order to prevent the indexes conflicting with each other in storage. Similarly, the second piece of correspondence data 450 corresponds with the elements 1, 2, and 5 and is equal to 7<<10|5<<5|0. In other words, the value 0, concatenated with the value 5 left shifted five times, concatenated with the value 7 left shifted ten times. This represents the fact that the value 3 occurs in an index 0, the value 2 occurs in an index 5, and the value 1 occurs in an index 7. This is shown in the first row of matrix a in FIG. 2. Note that since the correspondence data is grouped together in a row-by-row basis, it is possible to know the location of a given value based on the index that forms part of the correspondence data.

Similarly, the data stored in the second vector register $VR_{b'}$ contains two items of further correspondence data 460, 470. The first piece of correspondence data 460 corresponds with the elements B, C, and D and is equal to 6<<10|3<<5|0.

In other words, the value 0, concatenated with the value 3 left shifted five times, concatenated with the value 6 left shifted ten times. This represents the fact that the value D is stored at a index 0, the value C is stored in an index 3, and the value B is stored in an index 6. This is shown in the second column of matrix b in FIG. 2. The second piece of further correspondence data 470 corresponds with the values 8, 9, and A and is equal to 7<<10|3<<5|0. In other words, the value 0, concatenated with the value 3 left shifted 5 times, concatenated with the value 7 left shifted ten times. This indicates that the value A occurs at an index 0, the value 9 occurs at an index 3, and the value 8 occurs at an index 7. Again, this is shown as the first column of matrix b in FIG. 2. Note that since the further correspondence data is grouped together in a column-by-column basis, it is possible to know the location of a given value based on the index that forms part of the correspondence data.

Note that no correspondence data is necessary for the data elements of the accumulator matrix c since the accumulator matrix has not been compressed in the same manner as matrices a' and b'. Consequently, the third vector register $VR_c$ 430 simply contains the four values of the accumulator matrix c. Since there is no correspondence data and since there are only four values, more bits can be assigned to the elements of the accumulator matrix c. This is also appropriate, since the size of the elements of the accumulator matrix may be much larger, particularly if these represent the results of the addition of numerous multiplications.

Figure 5:
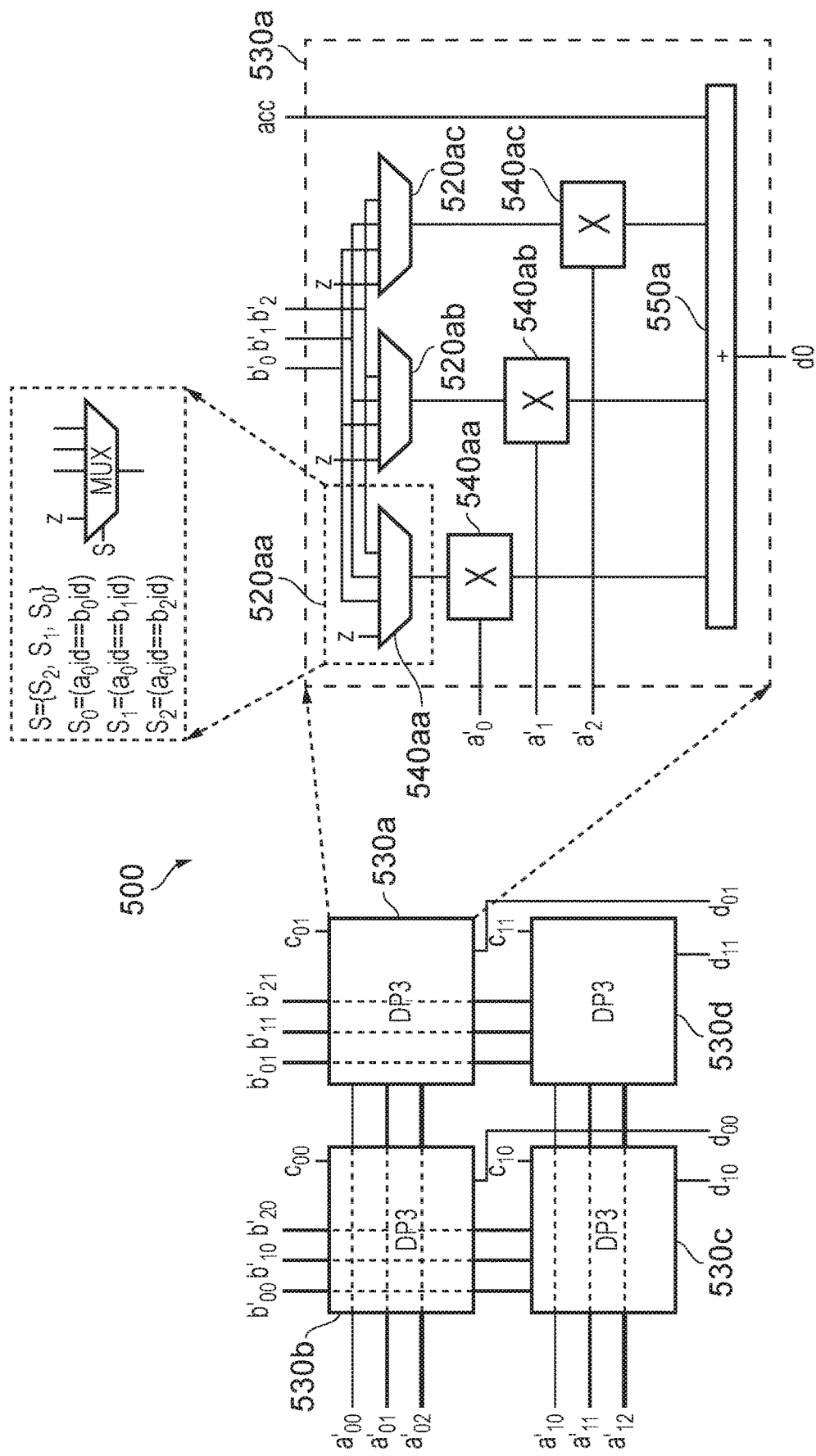
FIG. 5 shows, in accordance with some embodiments, circuitry capable of performing matrix operations in compressed matrices as previously illustrated.

FIG. 5 illustrates circuitry that is used for performing a multiply or multiply-accumulate operation between the two compressed matrices a' and b' and the accumulator matrix c'. The process involves performing a series of dot product operations. The circuitry 500 is made from four units 530a, 530b, 530c, 530d, each of which performs a dot product. Each of the units, 530a, 530b, 530c, 530d receives a different combination of elements of the first compressed matrix a' and the second compressed matrix b', as per a matrix multiplication operation. In addition, where a multiply-accumulate operation is performed, an accumulation element is to be passed into each of the four units 530a, 530b, 530c, 530d. For example, the dot product of the first column of the first compressed matrix a' and the first row of the second compressed matrix b' would produce an element at (1,1) of a result matrix. Where a multiply accumulate operation is to be performed, the element at (1,1) of the accumulator matrix must also be added to the result of the dot product operation to produce the result matrix. Similarly, the dot product of the first column of the first compressed matrix a' and the second row of the second compressed matrix b' would produce an element at (2,1) of the result matrix (second column, first row). If a multiply-accumulate operation is being performed, then the element at (2,1) of the accumulator matrix is also added to produce the result matrix. Whether or not a multiply or multiply accumulate operation is performed, the output of each of the four units 530a, 530b, 530c, 530d is one of the elements of a result matrix d.

FIG. 5 also illustrates the structure of one of the units 530a. The structure of the other units 530b, 530c, 530d is similar except for the elements of the compressed matrices a', b' and the element of the accumulator matrix c that are received.

In the illustrated example, the elements of the first row of the first compressed matrix a' and the elements of the first column of the compressed matrix b' are received. The unit 530a contains three determination circuits 520aa, 520ab, 520ac, and so the circuitry is able to support a compressed matrix b' having up to three elements per column (for the first compressed matrix b'). Each of the determination circuits 520aa, 520ab, 520ac receives each of the three elements of the compressed matrix b'. Furthermore, each of the determination circuits receives the value z (0) as a further input. In this example, each of the determination circuits 520aa, 520ab, 520ac takes the form of a multiplexer. The selection signal S of the multiplexer is made up from three components $s_2, s_1, s_0$. Each of these elements is a single bit with the overall selection signal S being one-hot.

As indicated in FIG. 5, for the first determination circuit 520aa, $s_0=(a_0\text{id}==b_0\text{id})$, $s_1=(a_0\text{id}==b_1\text{id})$, $s_2=(a_0\text{id}==b_2\text{id})$. In other words:

The first determination circuit 520aa has a first selection bit so equal to 1 if the index of the first provided element of the first compressed matrix a' is equal to the index of the first provided element of the second compressed matrix b'. Otherwise, the selection bit so is equal to 0.

The first determination circuit 520aa has a second selection bit $s_1$ equal to 1 if the index of the first provided element of the first compressed matrix a' is equal to the index of the second provided element of the second compressed matrix b'. Otherwise, the selection bit $s_1$ is equal to 0.

The first determination circuit 520aa has a third selection bit $s_2$ equal to 1 if the index of the first provided element of the first compressed matrix a' is equal to the index of the third provided element of the second compressed matrix b'. Otherwise, the selection bit $s_2$ is equal to 0.

The indexes are determined according to the correspondence data and further correspondence data. Accordingly, the selection signal indicates, for the first determination circuit 520aa, whether the index of any of the first provided element of the first compressed matrix a' is equal to the index of any of the three elements of the second compressed matrix b'. As will be appreciated, in a multiplication operation between a first matrix and a second matrix, a first element of the first matrix will interact with (be multiplied by) a second element of the second matrix if the indexes match. That is, if the column number of the first element is the same as the row number of the second element. The selection signal therefore indicates where any such match occurs, and this causes the matching element from the second matrix to be selected.

Consequently, the output of the determination circuitry 520aa is either equal to the value 0 when there is no interaction, or is equal to the value of one of the elements of the second compressed matrix b' if an interaction occurs between the first element of the first compressed matrix a' and that element of the second compressed matrix. This value is then passed to first functional circuitry 540aa in the form of first multiplication circuitry, which also receives as an input the first element of the first compressed matrix a'. The first multiplication circuitry 520aa then performs the multiplication. The output is passed to accumulation circuitry 550a in the form of an adder, which performs the addition portion of the dot product operation.

Second determination circuitry 520ab is provided in order to determine whether any interaction occurs between the three provided elements of the second compressed matrix b' and the second provided element of the first compressed matrix a'. Once again, the selection signal S is made up from three bits $s_0, s_1, s_2$. However for the second determination circuit 520ab, $s_0=(a_1\text{id}==b_0\text{id})$, $s_1=(a_1\text{id}==b_1\text{id})$, $s_2=(a_1\text{id}==b_2\text{id})$. The output of the second determination circuit 520ab is either one of the elements of the second compressed matrix b', which is deemed to interact with the second element of the first compressed matrix a', or z (0) if no interaction occurs. The result is passed to second multiplication circuitry 540ab. The second multiplication circuitry multiplies the value that is passed in together with the second element of the first compressed matrix a'. The result of the multiplication is then passed to accumulation circuitry 550a in the form of an adder, which performs the addition portion of the dot product operation.

In a similar manner, the third determination circuitry 520ac determines whether any of the three elements of the second compressed matrix b' interact with the third element of the first compressed matrix a'. Here, the selection signal bits are $s_0=(a_2\text{id}==b_0\text{id})$, $s_1=(a_2\text{id}==b_1\text{id})$, $s_2=(a_2\text{id}==b_2\text{id})$. The output of the second determination circuit 520ac is therefore zero or the one of the three provided elements of the second compressed matrix b' that are deemed to interact with the second element of the first compressed matrix a'. The output is passed to third multiplication circuitry 540ac where the result is multiplied by the third provided value of the first compressed matrix a' and this result is passed to the accumulator 550a.

The accumulation circuitry 550a adds together the result of each of the multiplication circuits 540aa, 540ab, 540ac. The accumulator also adds the provided element from the accumulator matrix c (if one is provided). This result makes up one of the values of the result matrix d, as illustrated in FIG. 5.

The other units 530b, 530c, 530d behave in a similar manner. Each of the determination circuitry 520 compares the indexes of the three provided elements of the second compressed matrix b' with the index of one of the three provided elements of the first compressed matrix a'. The three determination circuits in one unit collectively compare each of the indexes of the provided elements of the second compressed matrix b' with each of the indexes of the provided elements of the first compressed matrix a'.

Accordingly, it can be seen that by using the correspondence data and further correspondence data in the form of indexes, the determination circuitry is able to determine where an interaction occurs between elements of the first matrix a' and elements of the second matrix b'. If an interaction is deemed to occur then an operation (e.g. a multiplication) between those elements takes place. Otherwise, the multiplication that is performed is a multiplication by zero.

In this example, only three elements of each of the first compressed matrix a' and second compressed matrix b' are considered. However, it will be appreciated that this can be scaled by providing further inputs to the determination circuits 520, by providing further multiplication circuits 540. Furthermore, the output result that is provided is a 2×2 matrix and so four (2 multiplied by 2) units 530 are provided. However, where the output matrix d is larger, a larger array of units can be provided. For instance, if the output matrix was a 3×3 matrix, then nine such units 530 would be provided. Of course, in such a case, it is likely that the size of the compressed matrices would be similarly larger and so the size of the individual units 530 would likely also be expanded as previously described.

It will be appreciated that as a consequence of the apparatus 500, it is not necessary to perform the full set of operations that may be necessitated on the uncompressed matrices a, b. For instance, given the number of elements in the uncompressed matrices a, b, a total of 32 multiplications would be necessitated, however, due to the compression, it is only necessary to perform 12 multiplications in this example. Furthermore, many of the multiplications occur in parallel across the multiple units 530. As a consequence of both these reasons, the matrix operation can be performed more quickly than would be the case in an uncompressed matrix. Furthermore, it will be appreciated that the compressed matrices a' and b' are significantly smaller than the uncompressed matrices a and b and hence they can be stored using less storage space.

In this example, both of the matrices are compressed. However, it will be appreciated that one of the two matrices could be in an uncompressed form. Where this occurs, the correspondence data or further correspondence data is not needed, since the required indexes can be determined directly from the matrices themselves.

In other embodiments, an operation other than multiplication (or multiply-accumulate) could be performed. For instance, when adding two matrices together, the addition of one or two zero operands is essentially a redundant operation. Hence, where two values 'interact' with each other in an addition, the actual addition operation could be foregone by simply returning the non-zero operand (or zero if all operands are zero).

Figure 6:
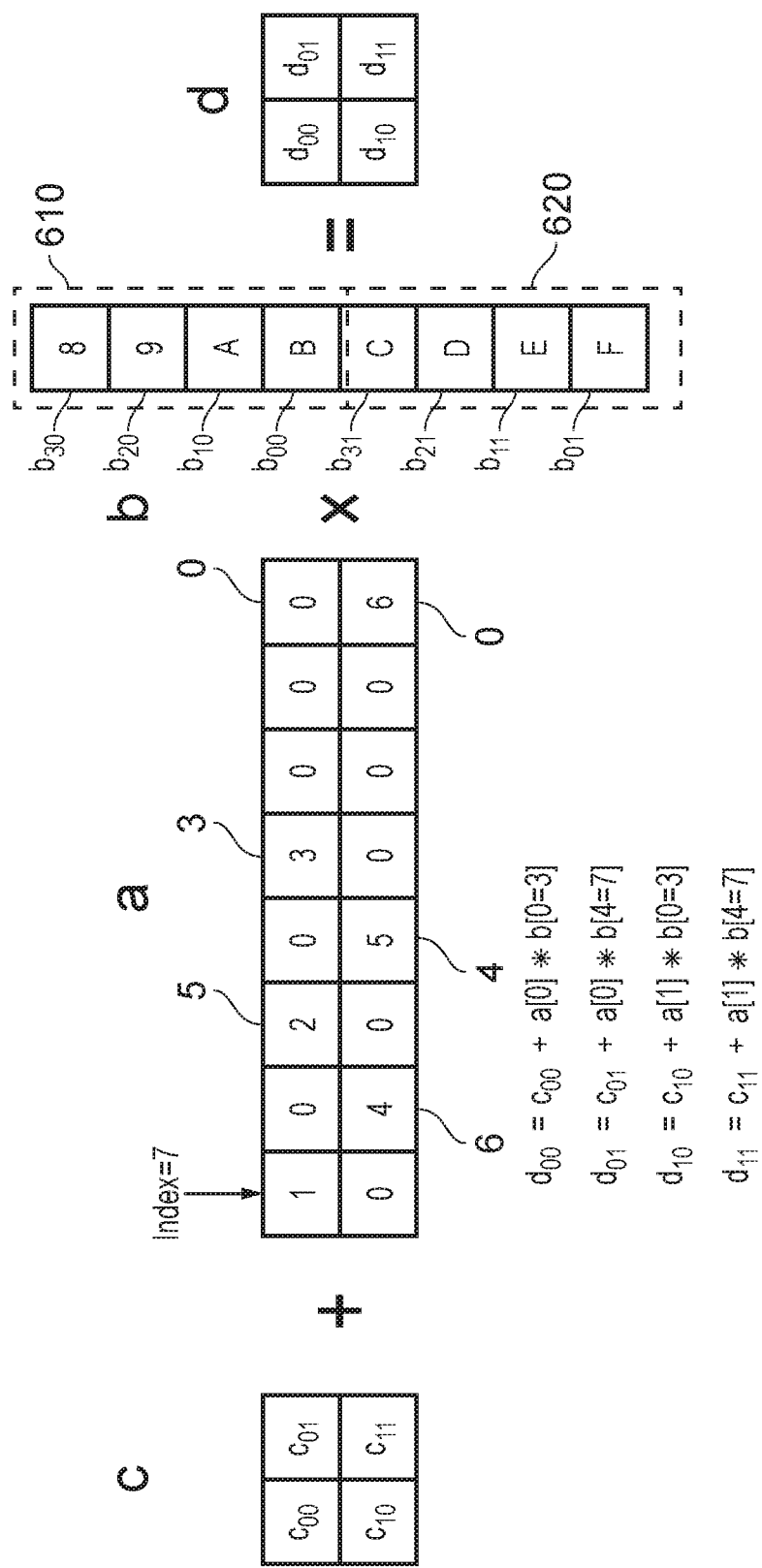
FIG. 6 illustrates a matrix multiply-accumulate operation where the second matrix is uncompressed.

FIG. 6 considers an example in which 'tiling' can be used to perform an operation where the first matrix and the second matrix have non-corresponding sizes. In particular, matrix a can be compressed due to being a sparse matrix with many non-zero entries. It can therefore be compressed from a 2×8 matrix a to a 2×3 matrix a' as previously illustrated. In contrast, matrix b is dense and has no non-zero entries, it therefore remains as an 8×1 matrix. Ordinarily, matrix multiplication between these matrices would produce a 2×1 matrix. However, by tiling, the 8×1 matrix can be treated as a 4×2 matrix having two columns 610, 620. The output of this is therefore a 2×2 matrix. Consequently, elements $d_{00}$ and $d_{10}$ are produced using the first half of matrix b 610 (bits 0 to 3). Meanwhile the elements $d_{01}$ and $d_{11}$ are produced by using the second half of the second matrix b 620 (bits 4 to 7).

Figure 7:
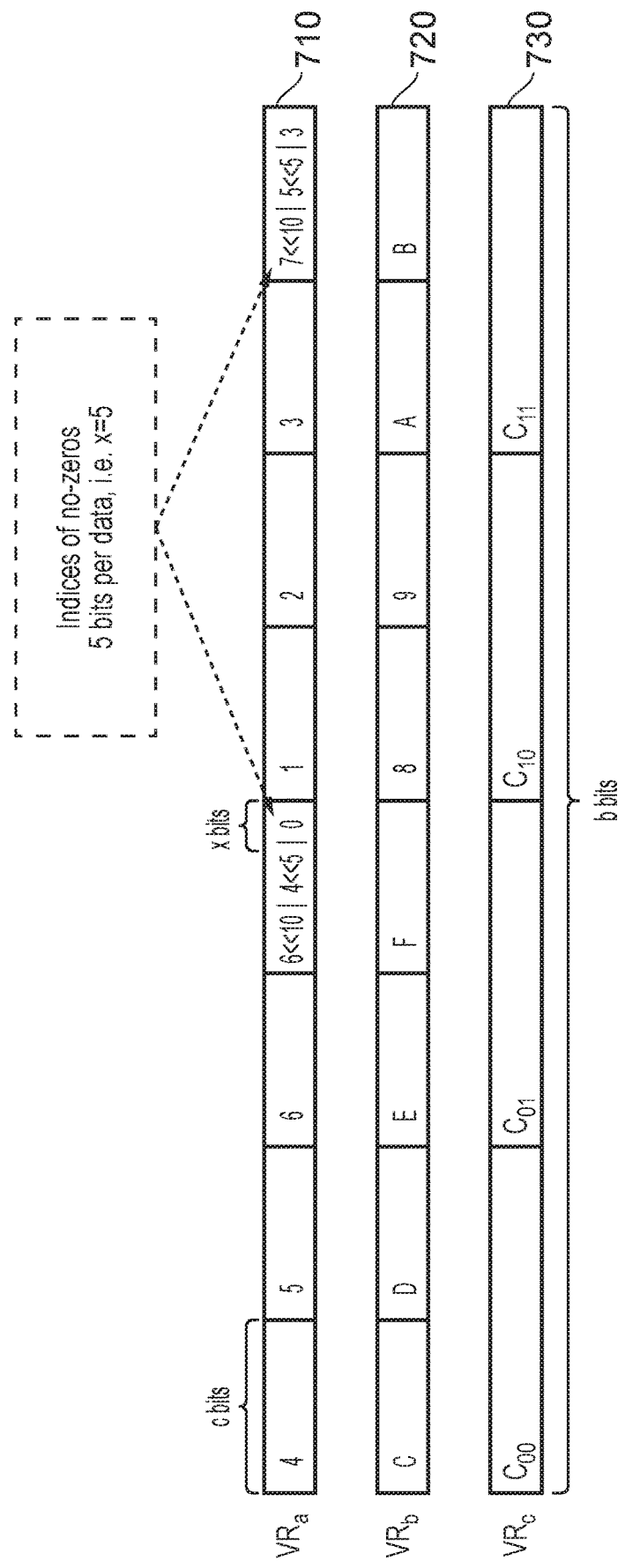
FIG. 7 illustrates how the uncompressed second matrix shown in FIG. 6 is stored in registers.

FIG. 7 illustrates how storage is achieved for the example of FIG. 6. In particular, the storage for the first compressed matrix a' and the accumulator matrix c occur in vector registers 710, 730 in the same manner illustrated with respect to FIG. 4. In the case of the second matrix b, since no further correspondence data is necessary (since no compression occurs) space is freed up for each of the elements of the second matrix b to be stored.

Figure 8:
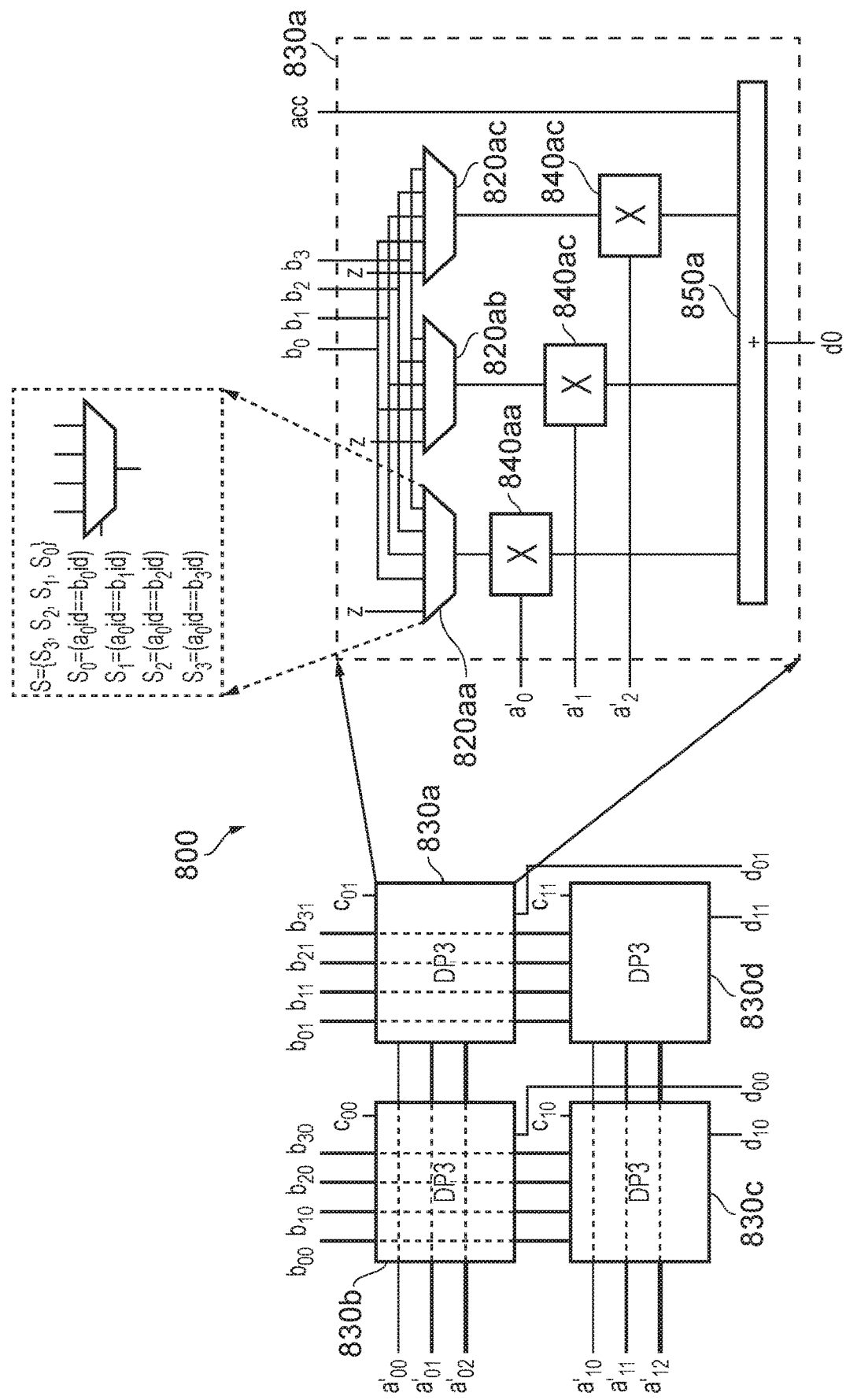
FIG. 8 shows, in accordance with some embodiments, circuitry capable of performing matrix operations in compressed matrices as previously illustrated.

FIG. 8 illustrates circuitry 800 that can be used to perform a matrix operation where one of the two matrices has a non-corresponding size. In this example, the matrix b remains in its uncompressed form and thus is technically an 8×1 matrix, which the circuitry of FIG. 8 instead treats as a 4×2 matrix, using tiling.

The circuitry 800 operates similarly to the circuitry 500 illustrated in FIG. 5. One key difference is that each of the four units 830a, 830b, 830c, 830d receives four inputs in relation to the second uncompressed matrix b, since the uncompressed matrix b is treated as having four rows.

Each of the determination circuits 820aa, 820ab, 820ac in the four units 830a, 830b, 830c, 830d receives four inputs together with the constant 0 (z). Furthermore, the selection signal S is made up from four components $s_0$, $s_1$, $s_2$, $s_3$. For example, in the case of the first unit 820aa, $s_0=(a_0\text{id}==b_0\text{id})$, $s_1=(a_0\text{id}==b_1\text{id})$, $s_2=(a_0\text{id}==b_2\text{id})$, $s_3=(a_0\text{id}==b_3\text{id})$. Once again, the components of the selection signal S therefore indicate whether an interaction occurs between a given element of the first compressed matrix a' and each of the presented elements of the second matrix b. In this case, further correspondence data is not available for the elements of the second matrix b because no compression takes place.

However, the further correspondence data is not needed because the location of each of the elements of the second matrix b is known.

The circuitry illustrated in FIG. 8 can also be used with a pair of compressed matrices such as for b'. This can be achieved by simply using the indexes provided as part of the (further) correspondence data. Similarly, while the circuitry of FIG. 8 can be used for multiplication of matrices with non-corresponding sizes (in this case, a compressed 2×3 matrix multiplied by an 8×1 matrix, which is treated as a 4×2 matrix), the same circuitry could also be used for smaller sized matrices by disregarding any superfluous input signals to the determination circuits 820 and by setting the corresponding selection bits of the selection signal S for those inputs to 0 so that they are not selected. For instance, the same circuitry could be used for the multiplication of a 2×3 matrix by another 2×3 matrix (as for FIG. 5) by disregarding the fourth inputs to the determination circuits 820 and by setting the value of the selection by $s_3$ to 0. In a case where the first matrix is smaller (e.g. if compressed matrix a' was 2×2), then the superfluous determination units 820 (and their associated multiplication units 840) are disregarded. For instance, if compressed matrix a' was a 2×2 matrix, then the third determination circuit 820ac and its associated multiplication unit 840ac are simply disregarded.

Figure 9:
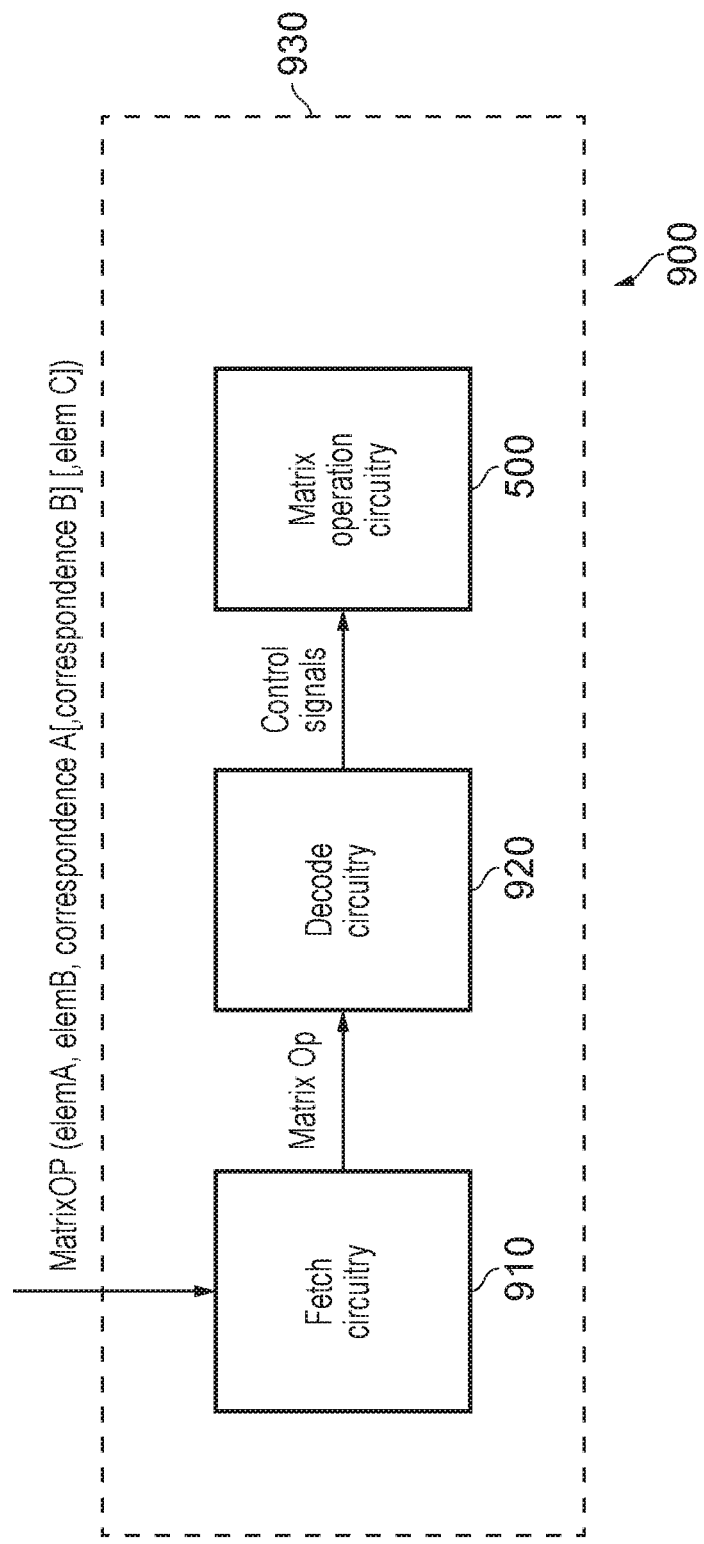
FIG. 9 shows, in accordance with some embodiments, circuitry for decoding matrix operation instructions.

FIG. 9 illustrates an apparatus 900 in accordance with some embodiments. The apparatus includes a number of components in the form of a pipeline 930. Within the pipeline 930, fetch circuitry 910 receives an instruction (MatrixOp) to perform a matrix operation. The instruction identifies elements of a first matrix (elemA), elements of a second matrix (elemB), correspondence data for the elements of the first matrix (correspondenceA), optional further correspondence data for the elements of the second matrix (correspondenceB), and optional elements of a third matrix accumulator (elemC). In each case, the reference to the elements of the matrix could be provided in the form of a register or registers, or a location in memory where the elements can be found. The fetch circuitry 910 passes the fetch instruction to decode circuitry 920. The decode circuitry decodes the instruction to provide one or more control signals. These control signals are then passed to matrix operation circuitry 500 such as that illustrated with respect to FIG. 5 or FIG. 8.

Figure 10:
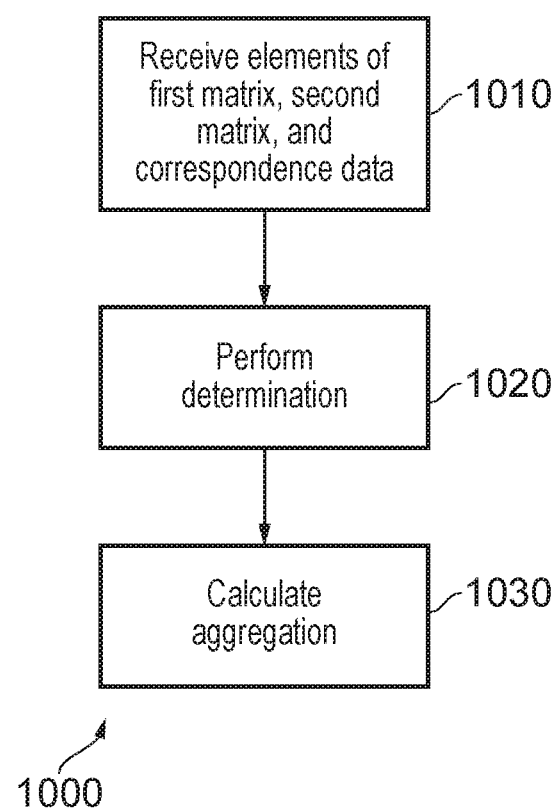
FIG. 10 shows a flowchart that illustrates a method of data processing in accordance with some embodiments.

FIG. 10 illustrates a method of data processing 1000 in accordance with some embodiments. At a step 1010, elements of a first matrix are received together with elements of a second matrix and correspondence data that indicates where the elements of a first matrix occur within a first matrix. At a step 1020, a determination is made as to which elements of the first matrix and the second matrix interact with each other according to a matrix operation. At a step 1030, an aggregation is performed by performing the matrix operation on the elements of the matrix and the second matrix that are deemed to interact with each other by the determination step 1020.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing method of performing an operation on a first matrix and a second matrix, the method comprising the steps:
   receiving, by decode circuitry, one or more instructions comprising a matrix operation instruction, wherein the matrix operation instruction references elements of the first matrix, elements of the second matrix, and correspondence data to indicate where the elements of the first matrix are located in the first matrix;
   storing the elements of the first matrix and the correspondence data in a vector register; and
   in response to receiving the matrix operation instruction, the decode circuitry generates one or more control signals in order to cause one or more execution units to perform a matrix operation on the first matrix and the second matrix.

2. The data processing method in claim 1, further comprising:
   performing, using the correspondence data, a determination of whether, for a given element of the first matrix in column i of the first matrix, a given element of the second matrix occurs in row of the second matrix; and
   calculating an aggregation between a given row in the first matrix and a given column in the second matrix, by performing, in dependence on the determination, a function on the given element of the first matrix and the given element of the second matrix to produce a partial result.

3. A data processing apparatus comprising:
   decode circuitry to receive one or more instructions comprising a matrix operation instruction, wherein the matrix operation instruction references elements of a first matrix, elements of a second matrix, and correspondence data to indicate where the elements of the first matrix are located in the first matrix, wherein the elements of the first matrix and the correspondence data are stored in a vector register, wherein
   in response to receiving the matrix operation instruction, the decode circuitry is configured to generate one or more control signals in order to cause one or more execution units to perform a matrix operation on the first matrix and the second matrix.

4. The data processing apparatus according to claim 3, wherein the one or more execution units comprise:
   receiver circuitry to receive the elements of the first matrix, the elements of the second matrix, and the correspondence data to indicate where the elements of the first matrix are located in the first matrix;
   determination circuitry to perform, using the correspondence data, a determination of whether, for a given element of the first matrix in column i of the first matrix, a given element of the second matrix occurs in row i of the second matrix; and aggregation circuitry to calculate an aggregation between a given row in the first matrix and a given column in the second matrix, comprising:
functional circuitry to perform, in dependence on the determination, a function on the given element of the first matrix and the given element of the second matrix to produce a partial result.

5. The data processing apparatus according to claim 4, wherein
the elements of the first matrix are elements of a compressed form of the first matrix; and
the compressed form of the first matrix is produced by removing at least some entries from the first matrix that are zero, and removing at least some columns or rows where each entry is zero.

6. The data processing apparatus according to claim 4, wherein
the correspondence data indicates, for each of the elements of the first matrix, a row number and a column number; and
the row number and the column number for a given element in the elements correspond with a row and column of where the given element is located in the first matrix.

7. The data processing apparatus according to claim 4, wherein
the receiver circuitry is adapted to receive further correspondence data to indicate where the elements of the second matrix are located in the second matrix; and
the determination circuitry is adapted to perform the determination using the further correspondence data in addition to the correspondence data.

8. The data processing apparatus according to claim 7, wherein
the further correspondence data indicates, for each of the elements of the second matrix, a row number and a column number; and
the row number and the column number for a given element in the elements correspond with a row and column of where the given element is located in the second matrix.

9. The data processing apparatus according to claim 7, wherein
the elements of the second matrix are elements of a compressed form of the second matrix; and
the compressed form of the second matrix is produced by removing at least some entries from the second matrix that are zero, and removing at least some columns or rows where each entry is zero.

10. The data processing apparatus according to claim 7, comprising
storage circuitry to store the elements of the second matrix, wherein
the storage circuitry comprises the further correspondence data.

11. The data processing apparatus according to claim 10, wherein
the storage circuitry is the vector register used to store the elements of the first matrix, or another vector register.

12. The data processing apparatus according to claim 10, wherein
a width of the storage circuitry is b bits;
each of the elements of the second matrix has a width of c bits; and
a number of the elements of the second matrix is at most b/c.

13. The data processing apparatus according to claim 12, wherein
a width of the further correspondence data is x bits for each of the elements of the second matrix; and
the number of the elements of the second matrix is at most b/(c+x).

14. The data processing apparatus according to claim 4, wherein
the matrix operation comprises a multiplication operation on the first matrix and the second matrix;
the aggregation circuitry comprises dot product circuitry to calculate, as the aggregation, a dot product of the given row and the given column;
the functional circuitry comprises multiplication circuitry to perform a multiplication as the function; and
the dot product circuitry comprises addition circuitry to add each partial result produced for the given row and the given column.

15. The data processing apparatus according to claim 14, wherein
the receiver circuitry is adapted to receive elements of a third matrix;
the operation comprises an addition operation of the third matrix with a result of the multiplication operation of the first matrix and the second matrix; and
the addition circuitry is adapted to add each partial result produced for the given row and the given column, together with the one of the elements of the third matrix.

16. The data processing apparatus according to claim 14, wherein
the multiplication circuitry is adapted to output the value '0' in response to the determination being that none of the elements of the second matrix occurs in row i of the second matrix.

17. The data processing apparatus according to claim 16, wherein
the determination circuitry is adapted, in response to the determination circuitry making the determination that the given element of the second matrix occurs in the location other than row j, column i of the second matrix, to provide the value '0' as an input to the multiplication circuitry.

18. The data processing apparatus according to claim 1, wherein
a width of the storage circuitry is b bits;
each of the elements of the first matrix has a width of c bits; and
a number of the elements of the first matrix is at most b/c.

19. The data processing apparatus according to claim 18, wherein
a width of the correspondence data is x bits for each of the elements of the first matrix; and
the number of the elements of the first matrix is at most b/(c+x).

* * * * *